US009633566B2

(12) United States Patent
Skvarce et al.

(10) Patent No.: US 9,633,566 B2
(45) Date of Patent: Apr. 25, 2017

(54) TRAILER BACKING PATH PREDICTION USING GPS AND CAMERA IMAGES

(75) Inventors: Jeffrey R. Skvarce, Clarkston, MI (US); Lorraine C. Krill, Macomb Township, MI (US); Jeffrey W. Weber, Royal Oak, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 251 days.

(21) Appl. No.: 13/331,598

(22) Filed: Dec. 20, 2011

(65) Prior Publication Data

US 2013/0158863 A1 Jun. 20, 2013

(51) Int. Cl.
B62D 13/06 (2006.01)
G08G 1/133 (2006.01)
G08G 1/16 (2006.01)
B62D 15/02 (2006.01)

(52) U.S. Cl.
CPC ............ G08G 1/168 (2013.01); B62D 13/06 (2013.01); B62D 15/0275 (2013.01)

(58) Field of Classification Search
CPC ................................ B62D 53/00; G08G 1/168
USPC ........................................................ 701/428
See application file for complete search history.

(56) References Cited

U.S. PATENT DOCUMENTS

| 6,292,094 | B1 * | 9/2001 | Deng et al. .................... 340/431 |
| 7,154,385 | B2 | 12/2006 | Lee |
| 2004/0215374 | A1 * | 10/2004 | Shepard ............................. 701/1 |
| 2004/0260439 | A1 * | 12/2004 | Endo et al. ...................... 701/36 |
| 2005/0074143 | A1 * | 4/2005 | Kawai ............................ 382/104 |
| 2005/0137784 | A1 * | 6/2005 | Grougan et al. ............... 701/200 |
| 2007/0027581 | A1 * | 2/2007 | Bauer et al. ...................... 701/1 |
| 2007/0239357 | A1 * | 10/2007 | Mori et al. ..................... 701/213 |
| 2008/0065328 | A1 * | 3/2008 | Eidehall .................. G01S 7/295 701/301 |
| 2010/0283632 | A1 * | 11/2010 | Kawabata et al. ......... 340/932.2 |

FOREIGN PATENT DOCUMENTS

| DE | 10065230 A1 | 12/2002 |
| DE | 102005043466 A1 | 3/2007 |
| DE | 102007032720 A1 | 1/2009 |
| DE | 102009012253 A1 | 9/2010 |
| GB | 2447672 A | 9/2008 |
| WO | 2014019730 A1 | 2/2014 |

OTHER PUBLICATIONS

U.S. Appl. No. 13/005,644.
European Search Report, EP12198548, dated Jun. 27, 2014.

* cited by examiner

*Primary Examiner* — Jerrah Edwards
*Assistant Examiner* — Charles J Han

(57) ABSTRACT

A method of controlling a vehicle and trailer assembly comprises obtaining an image for a current position of the vehicle and trailer assembly from a GPS system. The image is displayed on a display screen and a location is selected to indicate a desired final position for the vehicle and trailer assembly. An intended trailer backing path is determined with the desired final position of the vehicle and trailer assembly and a predicted trailer backing path is determined based upon a steering angle of the vehicle and an angle between the vehicle and the trailer. The predicted trailer backing path and the intended trailer backing path are displayed on the display screen to assist the operator in steering the vehicle.

14 Claims, 3 Drawing Sheets

TRAILER BACKING PATH PREDICTION USING GPS AND CAMERA IMAGES

TECHNICAL FIELD

The present disclosure relates to automotive vehicles and more particularly to advance driver assistance programs for automotive vehicles.

BACKGROUND

Backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer, particularly when backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of controlling a vehicle and trailer assembly comprises obtaining an image for a current position of the vehicle and trailer assembly from a GPS system for the vehicle and trailer assembly. The image is displayed on a display screen for the backing system. A location on the displayed image is selected to indicate a desired final position for the vehicle and trailer assembly. An intended backing path of the trailer is determined with the trailer backing system based upon the desired final position of the vehicle and trailer assembly and a predicted backing path of the trailer is determined with the trailer backing system based upon a steering angle of the vehicle and an angle between the vehicle and the trailer. The predicted backing path of the trailer and the intended backing path of the trailer are displayed on the display screen to assist the operator in steering the vehicle.

A method of controlling a vehicle and trailer assembly comprises obtaining an image for a current position of the vehicle and trailer assembly from a GPS system for the vehicle and trailer assembly. The image is displayed on a display screen for the trailer backing system. A location on the displayed image is selected to indicate a desired final position for the vehicle and trailer assembly. An intended backing path is determined with the trailer backing system based upon the desired final position of the vehicle and trailer assembly. The backing path of the trailer is displayed on the display screen.

A method of controlling a vehicle and trailer assembly comprises obtaining an image for a current position of the vehicle and trailer assembly from of a camera mounted to one of a vehicle and a trailer for the vehicle and trailer assembly. The image is displayed on a display screen for the backing system. A predicted backing path of the trailer is determined with the trailer backing system based upon a steering angle of the vehicle and an angle between the vehicle and the trailer. The predicted backing path of the trailer is displayed on the display screen to assist the operator in steering the vehicle.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
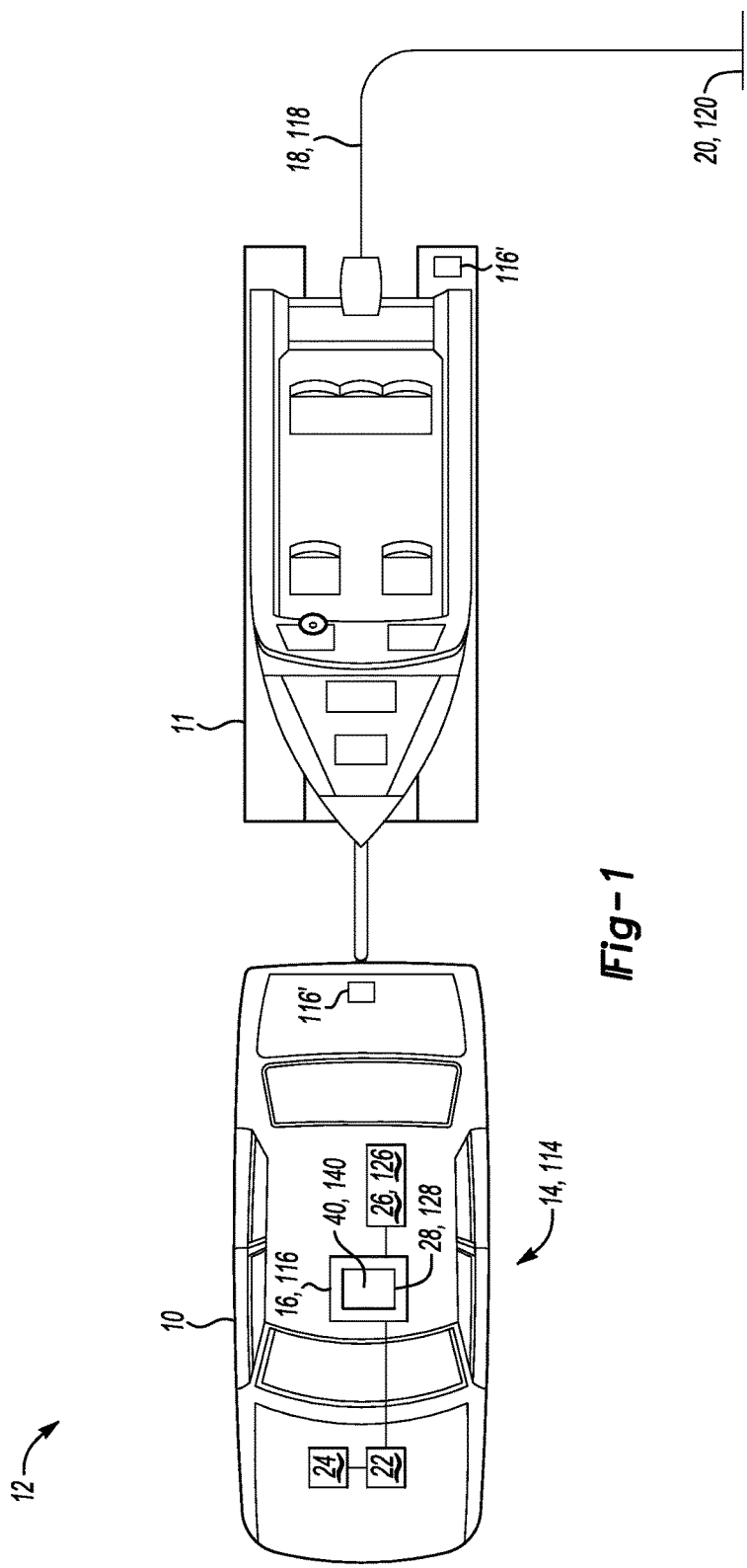
FIG. 1 is a schematic diagram of a trailer backing system of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a trailer 11. The trailer 11 is controllably secured to the vehicle 10 to form a vehicle and trailer assembly 12. The vehicle and trailer assembly 12 utilizes a trailer backing system 14 of the present invention. The trailer backing system 14 provides the vehicle operator with an arrangement for defining a trailer 11 backing path 18. The trailer backing system 14 utilizes the trailer backing path 18 to control movement of vehicle and trailer assembly 12 along the trailer backing path 18 or to assist the driver in controlling movement while backing the vehicle and trailer assembly 12.

Referring to FIG. 1, an electronic input device 16 is electronically connected to the vehicle 10 and the trailer backing system 14. The input device 16 may include at least one camera mounted to the vehicle 10 or trailer 11, such as indicated by input device 16'. Alternatively, the input device 16 may be a navigation or GPS unit for the vehicle 10.

The trailer backing system 14 includes a control unit 22 within the vehicle 10. The control unit 22 may be connected to at least one vehicle system 24 such as a powertrain system, a steering system and/or a braking system to control and direct movement of the vehicle and trailer assembly 12. The control unit 22 may send instructions to the vehicle systems 24 to move the vehicle and trailer assembly 12 along the trailer backing path 18 to a final location 20. The steering, braking, and other controls are calculated by the control unit 22 based upon the trailer backing path 18 input by the vehicle operator. Alternatively, the control unit 22 may utilize data from the vehicle system 24 to predict the movement of the vehicle and trailer assembly 12 while the vehicle operator controls the vehicle and trailer assembly 12.

The electronic input device 16 includes an input control mechanism 26 and a display screen 28. The electronic input device 16 may be all or partially incorporated into the vehicle 10. The electronic input device 16 may include a control panel and touch screen already within the vehicle 10, e.g. part of a navigation system or entertainment unit.

The input control mechanism 26 is used for inputting directions into the trailer backing system 14. For example, the input control mechanism 26 may be a joystick, knob, slider device, physical buttons, or virtual "touch screen"

buttons, which allows control of an "on screen" locator 40. The display screen 28 may illustrate an image of an area located behind the vehicle and trailer assembly 12 obtained from the camera or GPS system. The input control mechanism 26 may be manipulated to move the "on screen" locator 40 on the display screen 28 to select a final vehicle position 20.

Figure 2:
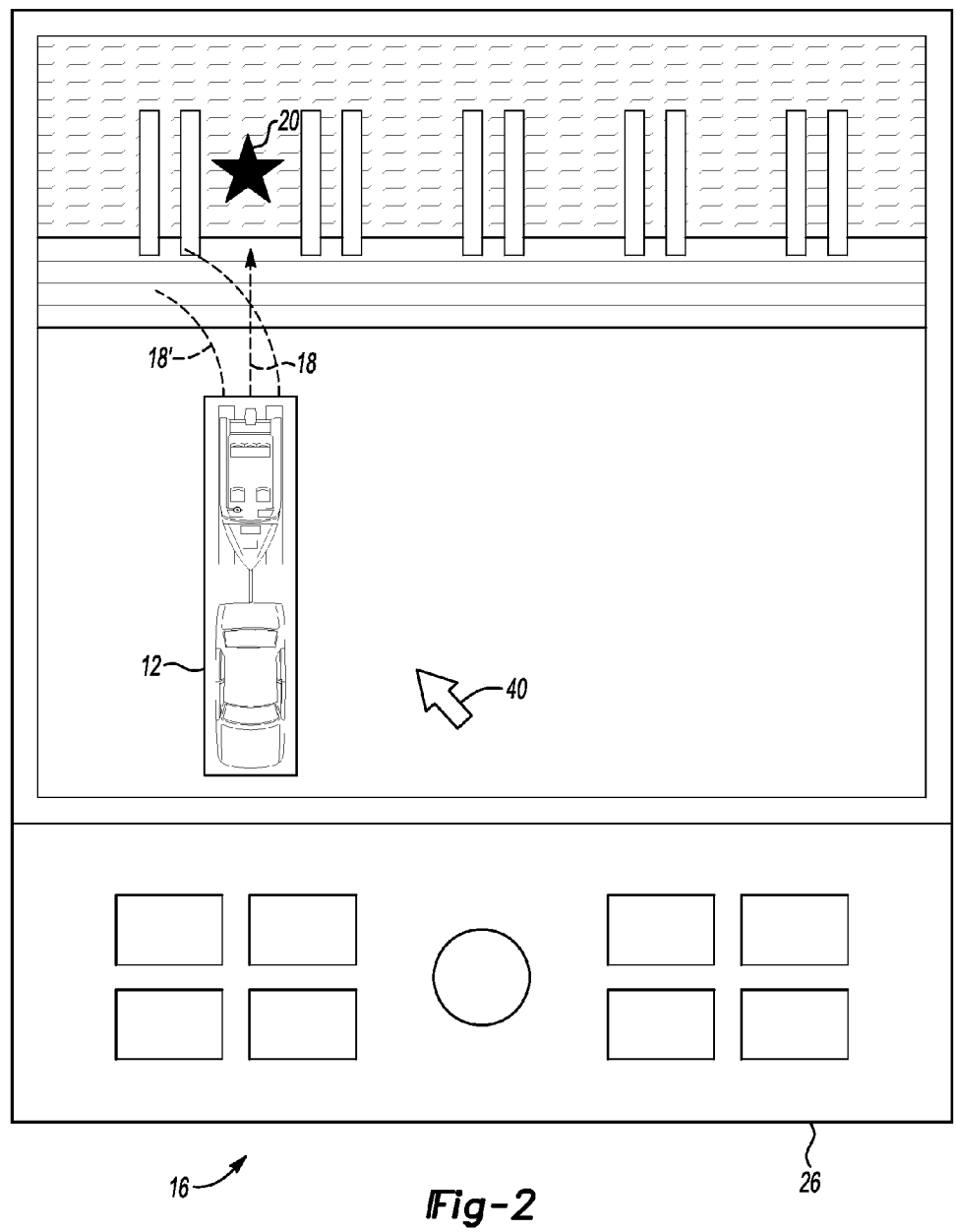
FIG. 2 is a schematic illustration of the backing system for the vehicle and trailer of FIG. 1.

Referring to FIGS. 1 and 2 a first embodiment of the trailer backing system 14 is described for the vehicle and trailer assembly 12. The display screen 28 of the electronic input device 16 shows an image of the vehicle and trailer assembly 12. The image may be a pre-captured overhead view of the location obtained by the GPS system based upon the current vehicle location. A schematic representation of the vehicle and trailer assembly 12 can be shown on the display screen 28 over the image at the appropriate position to represent the current vehicle location.

A vehicle operator would use the input control mechanism 26 to select a desired final position for the vehicle and trailer assembly 12 on the image shown of the display screen 28. The backing system 14 may correlate the selected final position in the image to GPS coordinates that represent that location. An intended trailer backing path 18 can be calculated by using the GPS coordinates of the vehicle and trailer assembly 12 current position and the final position 20. The intended trailer backing path 18 would include the suggested backing route and a final parking position 20.

Determining the intended trailer backing path 18 may include having the trailer backing system 14 identify objects in the image that correspond to permanent obstacles in the area, or outlined driving areas, i.e. the edges of the road, driveway, parking lot, etc. The intended trailer backing path 18 may be plotted to avoid any obstacles and stay within outlined driving area. The operator may be able to adjust the intended trailer backing path 18 as necessary or further define any obstacles.

Once the intended trailer backing path 18 is determined by the trailer backing system 14 the vehicle operator would instruct the trailer backing system 14 to follow the intended trailer backing path 18. The trailer backing system 14 would send instructions to the vehicle systems 24 to direct the vehicle and trailer assembly 12 to move the trailer 11 along the intended trailer backing path 18 to the final position 20. The backing system 14 may also further instruct at least one vehicle system 24 to direct the vehicle and trailer assembly 12 to move the trailer 11 along the intended trailer backing path 18 to the final vehicle and trailer assembly 12 position.

A method of controlling a vehicle and trailer assembly 12 comprises obtaining an image for the current position of the vehicle and trailer assembly 12 from a GPS system 24 for the vehicle and trailer assembly 12. The image is displayed on the display screen 28 for the trailer backing system 14. A location on the displayed image 28 is selected to indicate the desired final position 20 for the vehicle and trailer assembly 12. The intended trailer backing path 18 is determined by the trailer backing system 14 based upon the desired final position 20 of the vehicle and trailer assembly 12. The intended trailer backing path 18 is displayed on the display screen 28.

Alternately, the trailer backing system 14 may obtain data from the vehicle systems 24. The data may include information regarding the vehicle and trailer assembly 12 including, but not limited to an instantaneous steering angle for the vehicle, a length of the trailer, a track width of the trailer, and a distance between an axle and a hitch for the trailer 11. Based upon this information a predicted trailer backing path 18' may be shown on the image on the display screen 28. Displaying the predicted trailer backing path 18' of the trailer may include displaying the predicted location and direction of travel for wheel assemblies of the trailer 11.

That is, the predicted trailer backing path 18' may show the predicted track the wheel assemblies of the trailer 11 are about to drive, e.g. where the wheel assemblies of the trailer will drive for the next twenty feet from the current location. The display screen 28 may overlay the predicted trailer backing path 18' on the intended backing path 18. Using the display screen 28 the vehicle operator may view the intended trailer backing path 18 compared to the predicted trailer backing path 18' and may adjust steering on a steering wheel for the vehicle 10 to correct the predicted trailer backing path 18' to match the intended trailer backing path 18.

Therefore, another method of controlling the vehicle and trailer assembly 12 comprises obtaining an image for the current position of the vehicle and trailer assembly 12 from the GPS system 24 for the vehicle 11. The image is displayed on the display screen 28 for the backing system 14. A location on the displayed image 28 is selected to indicate the desired final position 20 for the vehicle and trailer assembly 12. The intended trailer backing path 18 is determined with the trailer backing system 14 based upon the desired final position 20 of the vehicle and trailer assembly 12 and the predicted trailer backing path 18' of the trailer 11 is determined with the trailer backing system 14 based upon a steering angle of the vehicle 10 and an angle between the vehicle 10 and the trailer 11. The predicted trailer backing path 18' of the trailer 11 and the intended backing path 18 of the vehicle and trailer assembly 12 are displayed on the display screen 28 to assist the operator in steering the vehicle 10.

Figure 3:
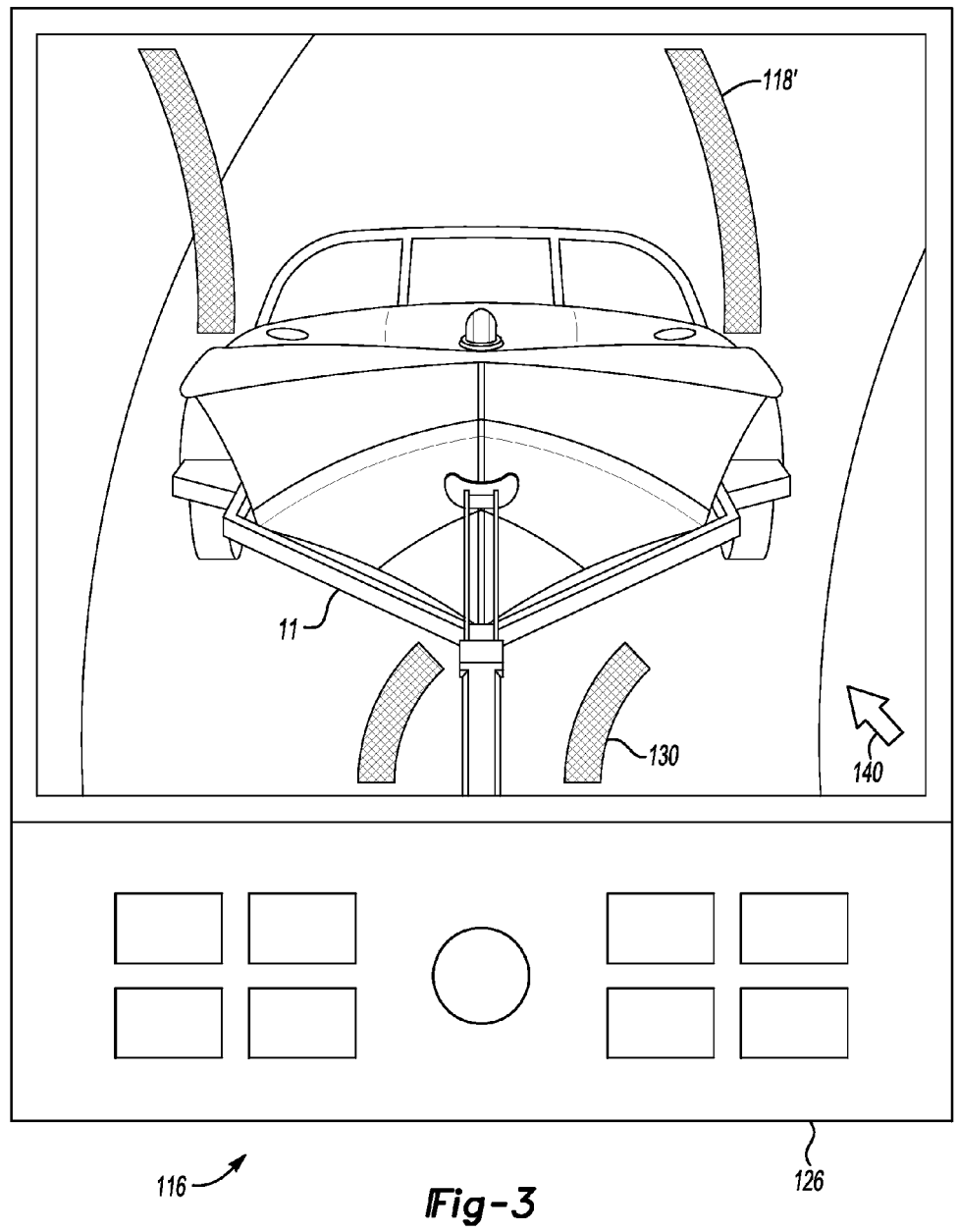
FIG. 3 is a schematic illustration of another embodiment of the backing system for the vehicle and trailer of FIG. 1.

Referring to FIGS. 1 and 3 another embodiment of the backing system 114 is described for the vehicle and trailer assembly 12. The display screen 128 of the electronic input device 116 shows an image of the vehicle and trailer assembly 12. The image may be a captured by at least one camera 116' mounted to the vehicle 10 and/or the trailer 11 which shows an exterior rear view of the vehicle and trailer assembly 12.

The trailer backing system 114 may obtain data from the vehicle systems 24. The data may include information regarding the vehicle and trailer assembly 12 including, but not limited to an instantaneous steering angle for the vehicle, a length of the trailer, a track width of the trailer, and a distance between an axle and a hitch for the trailer. Based upon this information a predicted trailer backing path 118' may be shown on the image on the display screen 28. The predicted trailer backing path 118' may show the predicted track the wheel assemblies of the trailer 11 are about to drive, e.g. where the wheel assemblies of the trailer 11 will drive for the next twenty feet from the current location.

Using the display screen 118 the vehicle operator may use the predicted trailer backing path 18' and may adjust steering on a steering wheel for the vehicle 10 to correct the predicted trailer backing path 118' to direct the vehicle and trailer assembly 12 toward a desired final position 120.

In addition to showing the predicted trailer backing path 118' of the trailer 11 a predicted vehicle path 130 may also be shown on the display screen 128. By showing both the predicted vehicle path 130 and the predicted trailer backing path 118' this may assist the vehicle operator in understanding and controlling an actual backing position of the vehicle and trailer assembly 12. For example, the predicted trailer backing path 118' illustrated in FIG. 3 shows that the trailer 11 is headed off of the road. The vehicle operator may adjust the steering of the vehicle 10 to direct the trailer 11 in the desired direction. The display screen 128 will shown the adjustments by updating the predicted trailer backing path 118' and vehicle backing path 130.

A method of controlling the vehicle and trailer assembly 12 according to the backing system 114 of FIG. 3 comprises obtaining an image for a current position of the vehicle and trailer assembly 12 from of the camera 116' mounted to one of the vehicle 10 and the trailer 11 for the vehicle and trailer assembly 12. The image is displayed on the display screen 128 for the trailer backing system 114. A predicted trailer backing path 118' of the trailer 11 is determined with the trailer backing system 114 based upon a steering angle of the vehicle 10 and an angle between the vehicle 10 and the trailer 128 to assist the operator in steering the vehicle and trailer assembly 12.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a vehicle and trailer assembly comprising:
   obtaining a GPS-based image of a current position of the vehicle and trailer assembly from a GPS system of the vehicle and trailer assembly;
   displaying the GPS-based image on a display screen of a trailer backing system;
   selecting a location on the GPS-based image displayed on the display screen to indicate a desired final position of the vehicle and trailer assembly on the GPS-based image and obtaining corresponding GPS coordinates of the desired final position;
   comparing, with an electronic control unit of the trailer backing system, the desired final position of the vehicle and trailer assembly on the GPS-based image to the current position of the vehicle and trailer assembly on the GPS-based image;
   performing image analysis on the GPS-based image with the electronic control unit and identifying, by the image analysis, obstacles in the map image proximate to the vehicle and trailer assembly and the desired final position;
   determining an intended trailer backing path with the electronic control unit wherein the intended trailer backing path avoids the obstacles identified by the image analysis and includes the desired final position of the vehicle and trailer assembly;
   determining, with the electronic control unit, a predicted trailer backing path based upon a steering angle of the vehicle and an angle between the vehicle and the trailer, wherein an input control mechanism for a driver to input control of the steering angle of the vehicle is based on input that is independent of a steering wheel for the vehicle; and
   displaying, on the display screen, the predicted trailer backing path and the intended backing path of the trailer overlaid on the GPS-based image to assist the operator in steering the vehicle;
   wherein the vehicle and trailer assembly are steerable by the driver, wherein steering of the vehicle will adjust the predicted trailer backing path to correct the predicted trailer backing path to match the intended trailer backing path.

2. The method of claim 1, wherein displaying the predicted trailer backing path of the trailer further comprises displaying predicted location and direction of travel of wheel assemblies of the trailer.

3. The method of claim 1, wherein determining a predicted trailer backing path based upon the steering angle of the vehicle further comprises using an instantaneous steering angle of the vehicle.

4. The method of claim 1, wherein determining a predicted trailer backing path further comprises using trailer data input into the trailer backing system, wherein the trailer data comprises at least one of: a length of a wheelbase of the trailer, a width of a wheelbase of the trailer, and a distance between an axle for the trailer and a hitch for the trailer.

5. The method of claim 1, further comprising displaying a predicted vehicle backing path on the display screen to assist the operator in steering the vehicle.

6. The method of claim 1, wherein sensors, the display, and the electronic control unit used by the trailer backing system are integrated into one of the vehicle and the trailer.

7. The method of claim 1, wherein using image analysis to identify obstacles further comprises identifying edges on displayed roads and paths as obstacles.

8. The method of claim 1, wherein the input control mechanism is a touch screen.

9. A method of controlling a vehicle and trailer assembly comprising:
   obtaining an image of a current position of the vehicle and trailer assembly from a camera mounted to a trailer of the vehicle and trailer assembly;
   displaying the image on a display screen of a trailer backing system, wherein the display screen is integrated within the vehicle;
   selecting a location on the image displayed on the display screen to indicate a desired final position of the vehicle and trailer assembly on the image;
   determining an intended trailer backing path with the electronic control unit;
   determining a predicted trailer backing path with an electronic control unit of the trailer backing system based upon a steering angle of the vehicle and an angle between the vehicle and the trailer, wherein a sensor for determining the angle between the vehicle and the trailer is integrated into one of the vehicle and the trailer, wherein an input control mechanism for a driver to input control of the steering angle of the vehicle is based on input that is independent of a steering wheel for the vehicle; and
   displaying, on the display screen, the predicted trailer backing path and the intended backing path of the trailer overlaid on the image to assist the driver in steering the vehicle;
   wherein the vehicle and trailer assembly are steerable by the driver, wherein steering of the vehicle will adjust the predicted trailer backing path to correct the predicted trailer backing path to match the intended trailer backing path.

10. The method of claim 9, wherein displaying the predicted trailer backing path further comprises displaying predicted location and direction of travel of wheel assemblies of the trailer.

11. The method of claim 9, wherein determining a predicted trailer backing path based upon a steering angle of the vehicle further comprises using an instantaneous steering angle of the vehicle.

12. The method of claim 9, wherein determining a predicted trailer backing path further comprises using trailer data input into the trailer backing system wherein the trailer data comprises at least one of: a length of the trailer, a track width of the trailer, and a distance between an axle for the trailer and a hitch for the trailer.

13. The method of claim 9, wherein the input control mechanism is a touch screen.

14. The method of claim 9 further comprising receiving an adjustment to the steering of the vehicle, updating the predicted trailer backing path, and displaying the updated predicted trailer backing path.

* * * * *